United States Patent [19]

Klein

[11] Patent Number: 4,864,137
[45] Date of Patent: Sep. 5, 1989

[54] OPTICAL SENSING SYSTEM

[75] Inventor: James E. Klein, Glendale, Calif.

[73] Assignee: Hughes Aircraft Company, Los Angeles, Calif.

[21] Appl. No.: 166,765

[22] Filed: Mar. 3, 1988

Related U.S. Application Data

[63] Continuation of Ser. No. 807,574, Dec. 11, 1985, abandoned.

[51] Int. Cl.$^4$ .............................................. G01J 1/00
[52] U.S. Cl. .................................... 250/343; 350/432; 250/338.1
[58] Field of Search ............................ 250/343, 338.1; 350/319, 432-435, 443

[56] References Cited

U.S. PATENT DOCUMENTS

| | | | |
|---|---|---|---|
| 3,034,398 | 5/1962 | Barnes et al. | 250/338 |
| 3,165,749 | 1/1965 | Cushner | 250/505.1 |
| 3,167,652 | 1/1965 | Weisbrich, Jr. | 250/505.1 |
| 3,363,962 | 1/1968 | Vogl | 250/353 |
| 3,951,523 | 4/1976 | Nishimoto | 350/432 |
| 4,600,276 | 7/1986 | Bietry | 350/432 |
| 4,695,119 | 9/1987 | Neil | 350/1.2 |
| 4,705,343 | 11/1987 | Simons | 350/1.3 |

OTHER PUBLICATIONS

"Thin Fused Quartz Window for Far Infrared Radiation", by Rogoff et al., Rev. of Scientific Instruments, vol. 41, No. 19, Oct. 1970.
"The Use of Aspherical Surfaces in Optical Instruments", by Kulikovskaya et al., Optical Technology, vol. 38, No. 7 Jul. 7, 1971.
"Use of Aspherical Surfaces in Optical Systems", by Zöllner Jena Review, vol. 12, No. 1, 1967.
Hughes Aircraft Document entitled, "Tow Roof Sight-TRS", 1 page.
Hughes Aircraft Document entitled, "Night Vision System", 1 page.

Primary Examiner—Craig E. Church
Assistant Examiner—John C. Freeman
Attorney, Agent, or Firm—William J. Streeter; Mark J. Meltzer

[57] ABSTRACT

An optical sensing system is described which generally comprises an infrared sensor, and a curved diffraction-limited window disposed in front of the sensor such that the optical axis of the sensor is parallel to and displaced from the symmetry axis of the window. The window has an inner radius of curvature which is non-concentric with the outer radius of curvature in order to remove the optical power of the window. Additionally, the window is provided with an aspheric profile outer surface, in order to correct for spherical aberrations in the window. The window is made out of germanium and is particularly useful for a sensor which has an 8-12 micron infrared radiation detection band width.

5 Claims, 2 Drawing Sheets

OPTICAL SENSING SYSTEM

This application is a continuation of application Ser. No. 807,574, filed Dec. 11, 1985, now abandoned.

TECHNICAL FIELD

The present invention generally relates to optical sensing systems, and particularly relates to infrared sensing systems which utilize a curved diffraction limited germanium window or lens.

BACKGROUND OF THE INVENTION

Many sub-sonic aircrafts, such as helicopters, use or will be using infrared optical sensing systems. In this application, a pod or turret containing an infrared sensor is mounted on the aircraft. Servo-mechanisms are used to rotate or otherwise articulate the pod to permit the sensor's field of view to be orientated in a variety of directions.

For protection from the airstream, the sensor is usually mounted behind the pod or turret flat window. The use of a flat window, however, creates a significant aerodynamic drag on the pod which make movement of the pod difficult at high speeds. Accordingly, the use of a curved rather than a flat window in this airborne optical application is very desirable from a reduced aerodynamic drag viewpoint. A reduction in the aerodynamic drag would not only reduce the torque needed to be produced by the pod servo-mechanism, but would also reduce the amount of fuel consumed by the aircraft. Additionally, a lower aerodynamic drag would reduce the mechanical vibrations on the pod or turret.

In spite of these mechanical advantages, the use of a curved window introduces difficult optical problems for the sensor. These problems include the optical power of the curved window and the aberrations of a window. One approach to solving these optical problems would be to try to have the sensor compensate for the optically induced aberrations in the curved window. However, this approach is undesirable because it will require complex and costly modifications to the sensor.

Another prior approach to solving these problems was the use of a curved window design consisting of a hemi-spherical germanium shell. This window possessed weak negative optical power, spherical aberration, coma and chromatic aberration. Additionally, when the optical axis of the sensor was positioned along a line which did not pass through the center of the hemi-spherical dome, the dome also introduced axial coma. While the use of germanium as the window could reduce the chromatic aberration to acceptable levels, correction of the defocus and remaining aberrations would still have to be accomplished through complex and costly design modifications to the sensor.

In contrast to the above, the present invention minimizes the aberrations of a curved window by utilizing certain changes to the hemi-spherical germanium shell of the window. These parametric changes compensate for the optical aberrations which would otherwise make it difficult for a sensor to see through the window.

These parameric changes are determined through a process which optimizes the optical design of the curved window. This process may conveniently utilize conventional optical design computer programs which will calculate the ray traces through the window. The object of the process is to minimize the bend in the ray aberrations as they pass through the window. Aside from basic information about the window, such as a starting inner radius of curvature, the rays themselves need to be defined. The directions for a set of meriodional and skew rays (e.g., 20) need to be defined over the field of view for the aperture of the sensor. The angles of the rays after they have passed through the window will be calculated. The variables from these calculations, such as the conic constant and the aspheric terms, can then be changed to minimize the differences between target and actual values for the ray traces using a damped least squares analysis. The terms which result from this procedure, such as the inner radius of curvature, the conic constant and the aspheric constants, can then be employed in an equation which will describe the window's surface profile for machining.

SUMMARY OF THE INVENTION

The present invention provides an optical sensing system which generally is comprised of an infrared optical sensor, and a curved diffraction-limited window disposed in front of the sensor such that the optical axis of the sensor is parallel to and displaced from the symmetry axis of the window. The window has an inner radius of curvature which is non-concentric with the outer radius in order to remove the optical power of the window. Additionally, the window is provided with an aspheric outer surface which has a profile so as to correct for aberrations in the window. The window is made out of germanium and is thus particularly useful for a sensor which has an 8-12 micron wavelength band. With such a diffraction limited window, the optical system will be much more suited for high speed airborne applications (e.g., 200-600 mph). Additionally, this window design will eliminate the need for optical aberrations being corrected within the optical sensor, and thus facilitate the retro-fitting of existing aircraft pods with optical systems according to the present invention.

Additional advantages and features of the present invention will become apparent from a reading of the detailed description of the preferred embodiments which make reference to the following set of drawings:

DETAILED DESCRIPTION OF THE PREFERRED EMBODIMENTS

Figure 1:
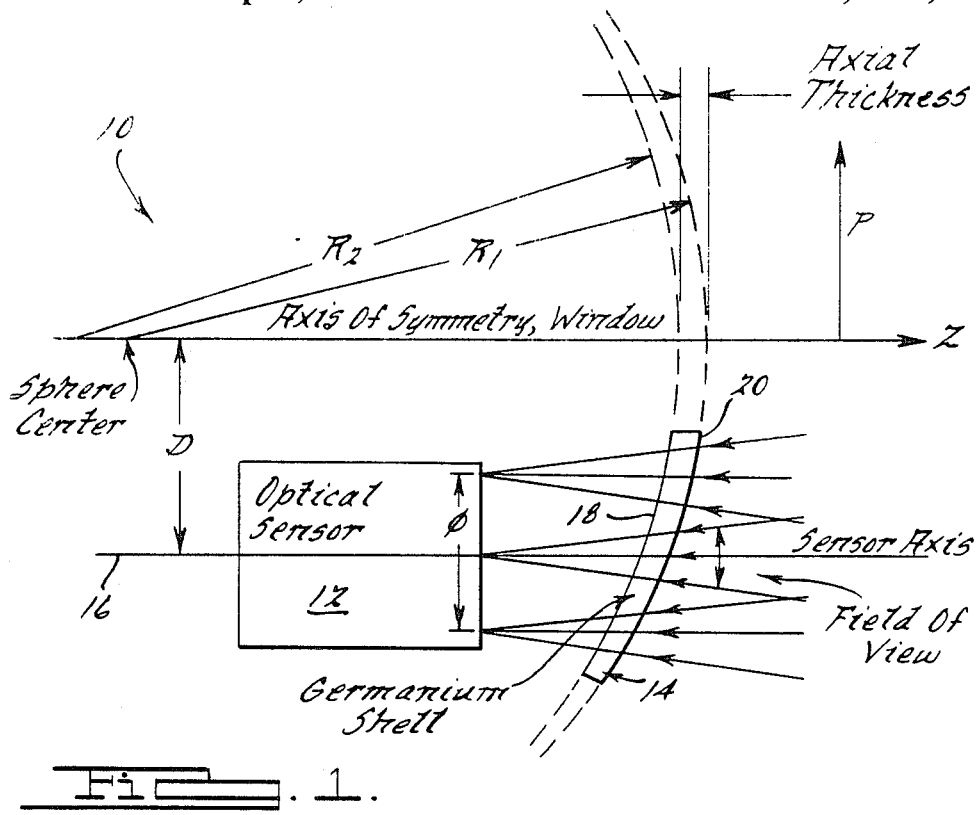
FIG. 1 is a diagrammatic side view of an optical sensing system according to the present invention.

Referring to FIG. 1, a diagrammatic side view of an optical sensing system 10 according to the present invention is shown. The optical system 10 generally comprises an infrared sensor 12 and a generally spherically curved window 14. The sensor 12 has an infrared radiation detection band width in the 8-12 micron range. The optical sensor 12 also has an aperture $\phi$ which looks through a portion of the curved window 14. The sensor 12 also has a center optical axis 16 which is parallel to the symmetry axis "Z" of the curved window 14. The optical axis 16 of the sensor 12 is also displaced laterally from the window symmetry axis Z of the window 14 by a distance "D". Thus, the sensor 12 is positioned off-axis from the symmetry axis Z of the window 14. The curved window 14 is preferably made out of germanium due to its low optical dispersion in the 8-12 micron infrared radiation band. The window 14 has an inner radius of curvature $R_2$ and an outer radius of curvature $R_1$.

In accordance with one embodiment of the present invention, the spherical shell of the window 14 is provided with certain parametric changes which are symmetric with respect to the axis Z of the window. The first of these changes relates to the inner surface 18 of the window 14. The radius of curvature $R_2$ of the inner surface 18 is changed slightly from a state of concentricity with the outer surface 20 to a curvature which will yield a zero optical power lens. Accordingly, the thickness of the window 14 will vary slightly from the center of the window to the edges of the window based upon this change. The term optical power refers to the inverse of the focal length of the lens or window.

The other parametric change to an otherwise concentric spherical window shell relates to the outer surface 20 of the window 14. The outer surface 20 is provided with a profile which will change the surface from a sphere to an asphere in order to correct for aberrations. The surface profile of the outer surface 20 (radius $R_1$) is given by the equation below.

$$Z = \frac{\rho^2}{R\left[1 - (K+1)\frac{\rho^2}{R^2}\right]} + d\rho^4 + e\rho^6 + f\rho^8 + g\rho^{10}$$

In all cases, the constant "K" will be non-zero. Depending upon the relative values of D and $\phi$ compared with $R_1$ and $R_2$, some of the general aspheric coefficients may be able to be set to zero and still result in a diffraction limited window. Larger relative apertures of the sensor and larger relative offsets from the symmetry axis Z of the window will require higher order aspheric terms for acceptable aberration correction.

Figure 2:
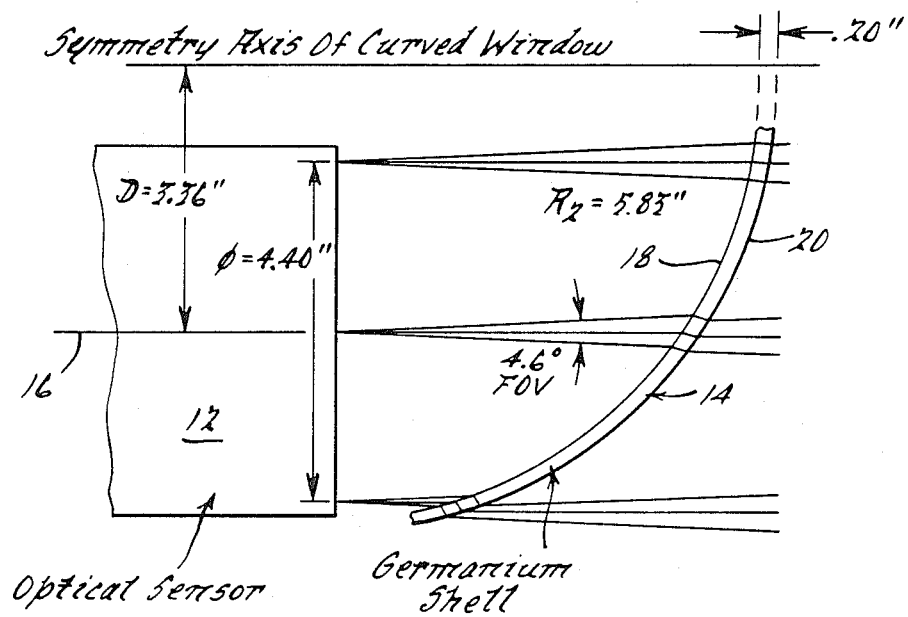
FIG. 2 illustrates a computer model of the optical sensing system shown in FIG. 1.

Referring to FIG. 2, a computer model of the off-axis optical sensing system 10 is shown. In particular, FIG. 2 shows ray traces for infrared radiation being received at the top, bottom and center of the sensor field of view. The general asphere terms described by the equation above are set forth below:

| |
|---|
| R = 5.980 |
| K = −.00164 |
| d = −.15261E-7 |
| e = −.29170E-8 |
| f = 0 |
| g = 0 |

Figure 3:
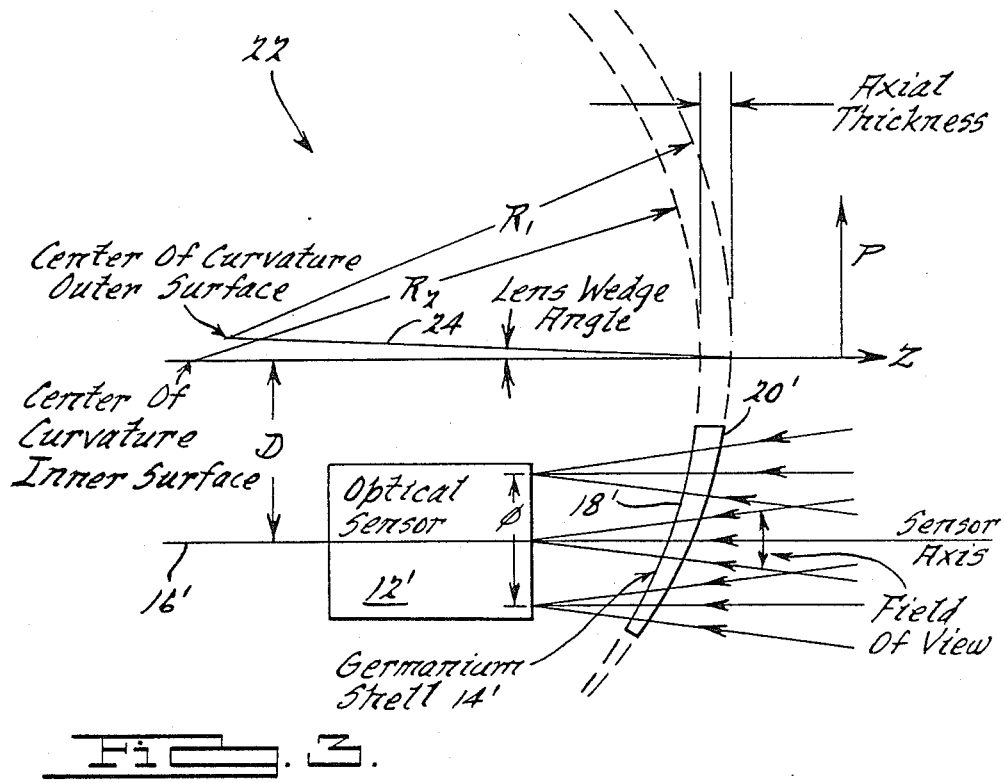
FIG. 3 is a diagrammatic side view of an additional embodiment of an optical sensing system according to the present invention.

Referring to FIG. 3, an alternative embodiment of an off-axis optical sensing system 22 according to the present invention is shown. In this embodiment, not all of the parametric changes to the concentric spherical shell of the window 14' are symmetric with respect to the symmetry axis Z' passing through the spherical center of the window. Due to the similarity between the embodiments of FIGS. 1 and 3, similar components used in these Figures are primed in FIGS. 3 and 4. As in the case of the embodiment shown in FIG. 1, the radius of curvature $R'_2$ for the inner surface 18' is modified to yield a zero power lens. However in contrast with the previous embodiment, the optical system 22 provides only a point-testable conic profile to the outer surface 20' of the window 14'. This outer surface profile is characterized by the equation set forth below:

$$Z = \frac{\rho^2}{R\left[1 - (K+1)\frac{\rho^2}{R^2}\right]} ; K \leq 0$$

Figure 4:
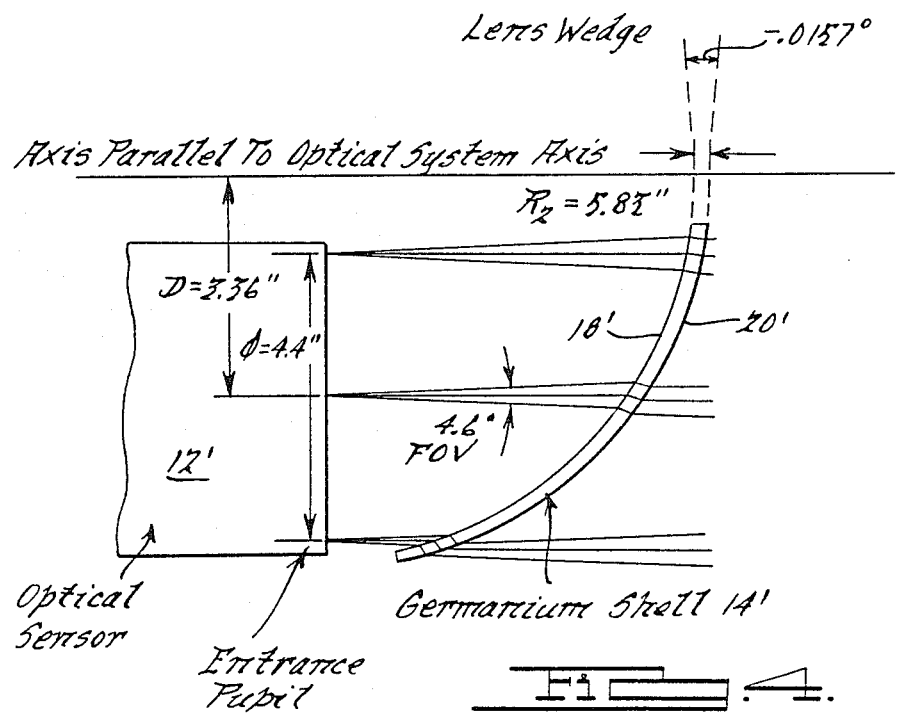
FIG. 4 is an illustration of a computer model for the optical sensing system shown in FIG. 3.

In place of the general terms used in the equation for the first embodiment, a wedge 24 is built into the curved window 14'. The wedge 24 and the conic profile are used for aberration minimization. The wedge 24 is indicated in FIG. 3 by the fact that the optical axis of symmetry for the outer surface 20' does not coincide with the optical axis of symmetry for the inner surface 18'. Accordingly, the centers of curvature for the inner and outer surfaces will not be at the same point. The wedge 24 introduces aberrations which will counter the aberrations in a concentric window. For example, the wedge 24 will introduce coma which will counter the coma terms which are inherent in the concentric shell. As in the case of FIG. 2, FIG. 4 illustrates a computer model of the optical system 22. The point-testable conic terms described in the equation above are set forth below:

R = 5.975

K = −0.00164

It will be appreciated by those skilled in the art that the non-spherical surface profiles described above can be generated using current precision diamond machining techniques. Either direct probe measurements (accurate to $\lambda/2$ in the visible), or null-lens tests are available to test these non-spherical profiles. Additionally, it should be noted that optical design computer programs are commercially available for solving the equations set forth above, and for determining the change in the inner radius of curvature which will yield a zero optical power lens. Such optical design computer programs include "Code V" by Optical Research Associates, Pasadena, Calif. and "ACCOS V", by Scientific Calculations, Fishers, N.Y.

The various embodiments which have been set forth above were for the purpose of illustration and were not intended to limit the invention. It will be appreciated by those skilled in the art that various changes and modifications may be made to these embodiments described in this specification without departing from the spirit and scope of the invention as defined by the appended claims.

I claim:

1. A sensing system for high speed aircraft comprising:
    an aircraft;
    a sensor carried by the aircraft, said sensor having an optical axis and an aperture for detecting light in a given wavelength band;
    a one-piece curved window carried by the aircraft and positioned in front of the sensor aperture, said window having an inner surface with a given radius of curvature and a nonconcentric outer surface having a predetermined geometrical relationship with the inner surface for substantially eliminating the optical power of the window in front of the sensor, the center of curvature for the inner surface lying on a second axis parallel to and spaced from said optical axis, with the center of curvature of the outer surface being displaced from said second axis; and said outer surface being of a preselected aspheric profile for compensating for aberrations in the window.

2. The system of claim 1 wherein said sensor is an infrared sensor for detecting light in the 8-12 micron wavelength band.

3. The system of claim 2 wherein the window is made of germanium.

4. An infrared sensing system for high speed aircraft comprising:
   an aircraft;
   an infrared sensor carried by the aircraft, said sensor having an optical axis and an aperture for detecting a light in the 8-12 micron wavelength band;
   a one-piece curved window carried by the aircraft and positioned in front of the sensor aperture, said window having an inner surface with a given radius of curvature and a nonconcentric outer surface having a predetermined geometrical relationship with the inner surface for substantially eliminating the optical power of the window in front of the sensor, and said outer surface being of a preselected aspheric profile for compensating for aberrations in the window, and wherein the window has an axis of symmetry displaced from said optical axis and wherein the centers of curvature for the inner and outer window surfaces are on the axis of symmetry.

5. An infrared sensing system for high speed aircraft comprising:
   an aircraft;
   an infrared sensor carried by the aircraft, said sensor having an optical axis and an aperture for detecting light in the 8-12 micron wavelength band;
   a one-piece curved window carried by the aircraft and positioned in front of the sensor aperture, said window having an inner surface with a given radius of curvature and a nonconcentric outer surface having a predetermined geometrical relationship with the inner surface for substantially eliminating the optical power of the window in front of the sensor, and said outer surface being of a preselected aspheric profile for compensating for aberrations in the window, and wherein the window has at least one axis of symmetry, and wherein the optical axis of the sensor is displaced from the axis of symmetry of the window.

* * * * *